US012258257B1

(12) United States Patent
Melkonian et al.

(10) Patent No.: US 12,258,257 B1
(45) Date of Patent: Mar. 25, 2025

(54) RAPID CHILLING WATER DISPENSER

(71) Applicant: Brio Water Technology, Inc., City of Industry, CA (US)

(72) Inventors: Arman Melkonian, La Cañada Flintridge, CA (US); Mark Melkonian, Northridge, CA (US); Ravi Sawhney, Malibu, CA (US); Craig Steele, Manhattan Beach, CA (US); Samaykumar Patel, Santa Clarita, CA (US); Michael Kulick, Simi Valley, CA (US)

(73) Assignee: Brio Water Technology, Inc., City of Industry, CA (US)

( * ) Notice: Subject to any disclaimer, the term of this patent is extended or adjusted under 35 U.S.C. 154(b) by 0 days.

(21) Appl. No.: 18/583,669

(22) Filed: Feb. 21, 2024

(51) Int. Cl.
*B67D 1/08* (2006.01)
*B67D 1/00* (2006.01)
*B67D 1/12* (2006.01)

(52) U.S. Cl.
CPC ......... *B67D 1/0859* (2013.01); *B67D 1/0009* (2013.01); *B67D 1/0014* (2013.01); *B67D 2001/1259* (2013.01)

(58) Field of Classification Search
CPC .. B67D 1/0859; B67D 1/0009; B67D 1/0014; B67D 2001/1259
See application file for complete search history.

(56) References Cited

U.S. PATENT DOCUMENTS

| | | | | |
|---|---|---|---|---|
| 2,270,383 | A * | 9/1939 | Norton et al. | B67D 1/04 62/303 |
| 4,730,463 | A * | 3/1988 | Stanfill | B67D 1/0867 62/399 |
| 6,698,229 | B2 | 3/2004 | Renken et al. | |
| 7,305,847 | B2 * | 12/2007 | Wolski et al. | B67D 1/0888 62/390 |
| 10,266,385 | B2 * | 4/2019 | Lee et al. | F28D 7/02 |
| 11,161,730 | B1 | 11/2021 | Volftsun et al. | |
| 2003/0070446 | A1 | 4/2003 | Scullion et al. | |
| 2007/0204646 | A1 * | 9/2007 | Gagliano | F28F 13/12 62/389 |
| 2009/0152301 | A1 | 6/2009 | Guerra et al. | |
| 2017/0030632 | A1 | 2/2017 | Kranovich | |
| 2017/0035236 | A1 * | 2/2017 | Zhao et al. | B67D 1/0859 |

(Continued)

FOREIGN PATENT DOCUMENTS

| | | | | |
|---|---|---|---|---|
| EP | 3896374 | A1 * | 10/2021 | F25D 31/003 |
| GB | 2363777 | B | 10/2004 | |

(Continued)

OTHER PUBLICATIONS

EP 3896374 A1 Translation (Year: 2021).*
KR 102054974 B1 Translation (Year: 2019).*

*Primary Examiner* — Elizabeth J Martin
*Assistant Examiner* — Dario Antonio Deleon
(74) *Attorney, Agent, or Firm* — Foundation Law Group LLP

(57) ABSTRACT

A rapid water-chilling system for a water dispenser that can quickly replenish cold water in the water dispenser when water has been dispensed or the water rises above a pre-set limit; so that when a user requests cold water, the user does not get ambient or warm water dispensed instead of the requested cold water or has to wait for the water to be chilled back to the requested temperature.

19 Claims, 10 Drawing Sheets

(56) References Cited

U.S. PATENT DOCUMENTS

| | | | | |
|---|---|---|---|---|
| 2018/0016128 | A1* | 1/2018 | Park et al. | B67D 1/0864 |
| 2021/0123670 | A1* | 4/2021 | Ben-David et al. | F25D 31/003 |
| 2021/0284521 | A1 | 9/2021 | Sanchez et al. | |

FOREIGN PATENT DOCUMENTS

| | | | | |
|---|---|---|---|---|
| GB | 2443899 | A | 5/2008 | |
| GB | 2469878 | B | 10/2014 | |
| KR | 102054974 | B1 * | 12/2019 | F25D 31/002 |

* cited by examiner

RAPID CHILLING WATER DISPENSER

BACKGROUND

Current methods for chilling water dispensed from a water dispenser are inadequate for maintaining the water temperature at a fairly consistent cold temperature for the consumer when multiple users dispense cold water in a short timeframe. Present water dispensers, for the most part, rely on the traditional cold-tank technology and the ice bath method to keep water cool. Both of these methods have significant limitations in maintaining the water in the dispenser at the coldness consumers desire when cold water is dispensed in quick succession. Specifically, both of these methods cannot recover quickly enough to maintain the dispensable water at a coolness that consumers want.

The long used cold-tank method of chilling water is a straightforward way to chill water. With this method, the water dispenser has a large metal water holding tank that holds ambient water. The holding tank is wrapped with copper tubing coils that are, in turn, filled with refrigerant that chills the tank the water is held in; thereby making the water cold for dispensing. As the water in the tank is depleted, the cycle starts again, and if a significant amount of water is used, the user must wait for the water to get cold again. Another approach that tries to combat "the wait to chill" issue is the use of an "ice bath". With the "ice bath" approach, the water to be chilled and dispensed travels through coiled tubing that sits in a tank with very cold water (i.e. the "ice bath"). The ice bath temperature is maintained by refrigerant coils on the outside of the "ice bath" tank. The issue with the "ice bath" approach is that the "ice bath" water medium in the tank takes a long time to get cold, and this approach also requires the dispensed water to travel as slow as is acceptable to allow the dispensed water to get cold. So, in heavy demand situations, the consumer of the water from the "ice bath" dispenser still has to wait a significant amount of time to get water at the temperature he desires.

Accordingly, there is a need for a rapid chilling water dispenser that keeps cold water in a water dispenser at a temperature coolness below a pre-set limit, which is a temperature desired by the consumer and, if the water temperature rises above the pre-set desired temperature, is capable of rapidly chilling the water in the dispenser to get it below the pre-set limit.

SUMMARY

According to one aspect of the present invention, a rapid water-chilling system for use in a water dispenser may include a fast-chilling refrigerant pump; a refrigerant chilling system including a refrigerant; a rapid chill refrigerant circulation tank, wherein disposed within the rapid chill refrigerant circulation tank which includes a cold water storage tank; a fast-chilling refrigerant; a number of refrigerant coils; a number of water inlet coils, where the refrigerant coils are separated from the cold water storage tank inside the rapid chill refrigerant circulation tank; wherein the fast-chilling refrigerant pump is in fluid communication with the fast-chilling refrigerant and the outside of the cold water storage tank and the outside of the water coils; and where the refrigerant in the refrigerant chilling system is in fluid communication with the refrigerant coils disposed within the rapid chill refrigerant circulation tank.

According to another aspect of the present invention, a water dispenser in fluid communication with a water supply may include a water dispensing nozzle and a rapid water-chilling system, where the rapid water-chilling system may include a fast-chilling refrigerant pump; a refrigerant chilling system including a refrigerant; a rapid chill refrigerant circulation tank, where disposed within the rapid chill refrigerant circulation tank may include: a cold water storage tank, disposed in the top of the rapid chill refrigerant circulation tank, in fluid communication with the water dispensing nozzle; a number of water inlet coils in fluid communication with the water supply and the cold water storage tank, where a portion of the plurality of water inlet coils are disposed around the circumference of the outside of the cold water storage tank; a number of refrigerant coils disposed in the bottom of the rapid chill refrigerant circulation tank, where the refrigerant coils are separated from the cold water storage tank inside the rapid chill refrigerant circulation tank; a fast-chilling refrigerant disposed in the bottom of the rapid chill refrigerant circulation tank around the refrigerant coils; the fast-chilling refrigerant pump is in fluid communication with the fast-chilling refrigerant and the outside of the cold water storage tank and the outside of the water coils and where the refrigerant in the refrigerant chilling system is in fluid communication with the refrigerant coils disposed within the rapid chill refrigerant circulation tank.

According to yet another embodiment of the invention, a method for delivering sustained cold water from a water dispenser may include the steps of providing a water pump in fluid communication with a water supply; providing a water dispensing nozzle; providing a rapid water-chilling system, which may include a fast-chilling refrigerant pump; a refrigerant chilling system including a refrigerant; a rapid chill refrigerant circulation tank, wherein disposed within the rapid chill refrigerant circulation tank includes: a cold water storage tank disposed in the top of the rapid chill refrigerant circulation tank and in fluid communication with the water dispensing nozzle; a number of water inlet coils in fluid communication with the water pump and the cold water storage tank, where a portion of the water inlet coils are disposed around the circumference of the outside of the cold water storage tank; a number of refrigerant coils disposed in the bottom of the rapid chill refrigerant circulation tank, wherein the refrigerant coils are separated from the cold water storage tank inside the rapid chill refrigerant circulation tank; a fast-chilling refrigerant disposed in the bottom of the rapid chill refrigerant circulation tank around the refrigerant coils; where the fast-chilling refrigerant pump is in fluid communication with the fast-chilling refrigerant and the outside of the cold water storage tank and the outside of the water coils; where the refrigerant in the refrigerant chilling system is in fluid communication with the refrigerant coils disposed within the rapid chill refrigerant circulation tank; monitoring the temperature of the water in the cold water storage tank; if the temperature of the water in the cold water storage tank rises above a lower temperature limit, energizing the refrigerant chilling system to cool the refrigerant; circulating the cooled refrigerant through the refrigerant coils in the bottom of the rapid chill refrigerant circulation tank, where the refrigerant coils chill the fast-chilling refrigerant disposed in the bottom of the rapid chill refrigerant circulation tank; energizing the fast-chill refrigerant pump to pump the chilled fast-chilling refrigerant disposed in the bottom of the rapid chill refrigerant circulation tank to the top of the rapid chill refrigerant circulation tank, wherein the fast-chilling refrigerant flows inside the rapid chill refrigerant circulation tank and down the outside of, and in contact with, the water inlet coils and down the outside of, and in contact with, the outside of the cold water storage tank, where the chilled fast-chilling refrigerant cools any water inside the water inlet coils and the water inside the cold water storage tank.

DRAWINGS

Objects, features, and advantages of the present invention will become apparent upon reading the following description in conjunction with the drawing figures, in which.

Figure 9:
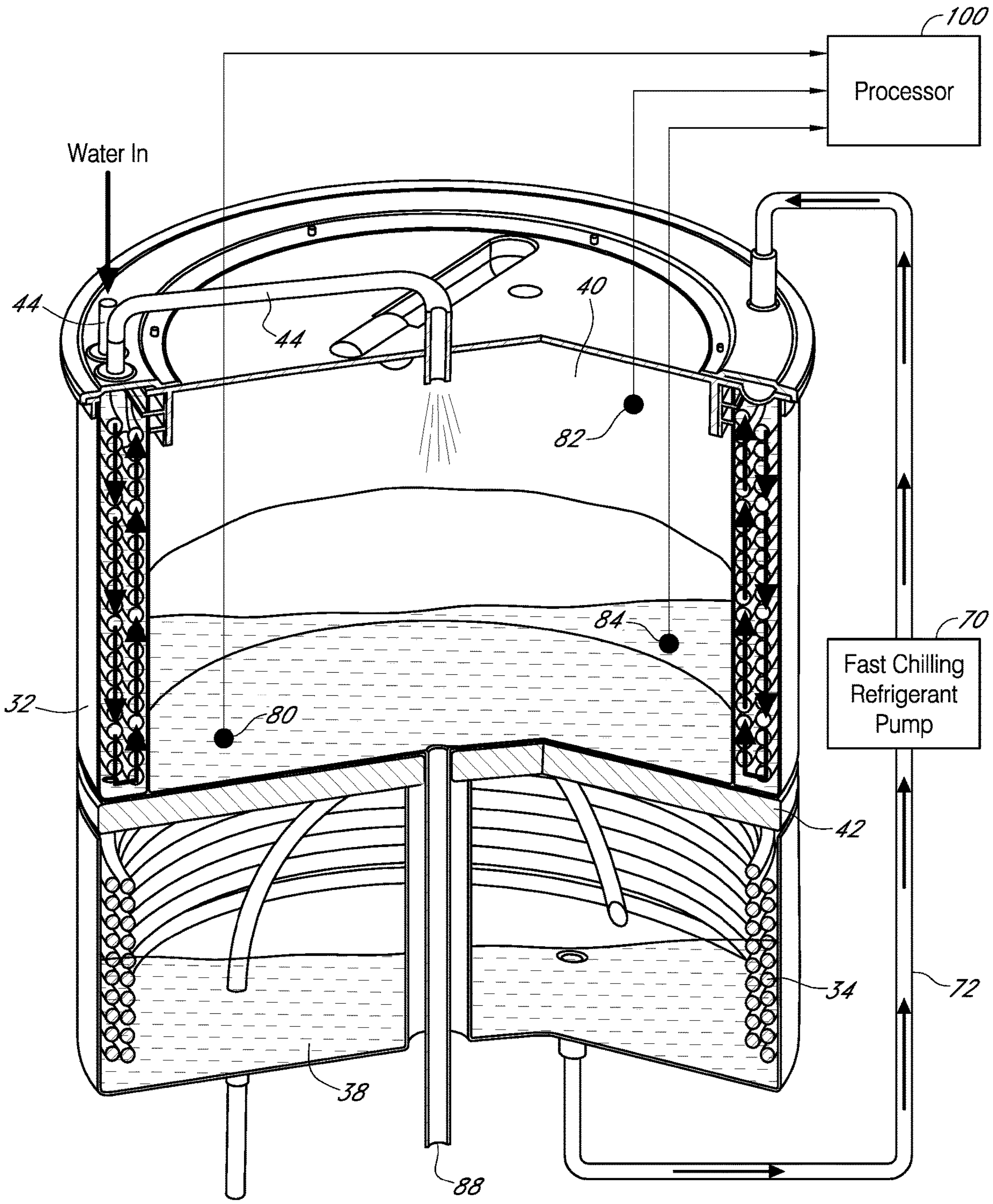
Figure 10:
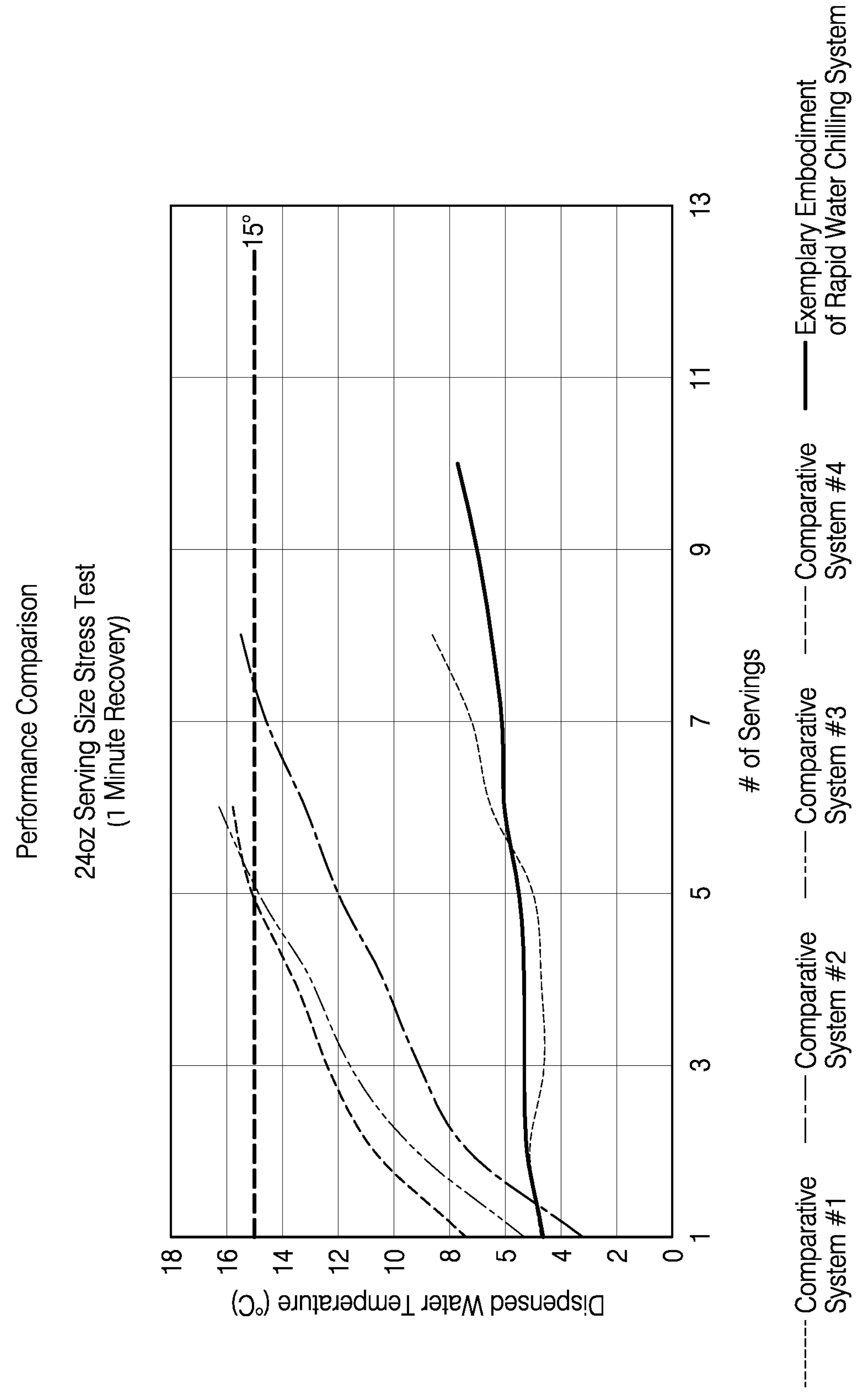

FIG. 9 is a sectional view of a rapid chill refrigerant circulation tank illustrating the flow of fast-chilling refrigerant through around the water inlet coils and the rapid chill refrigerant circulation tank of the present invention; and FIG. 10 is a chart illustrating the water chilling performance of a water dispenser utilizing an exemplary embodiment of a rapid water-chilling system of the present invention compared to four chilled water systems on the market.

DESCRIPTION

Figure 1:
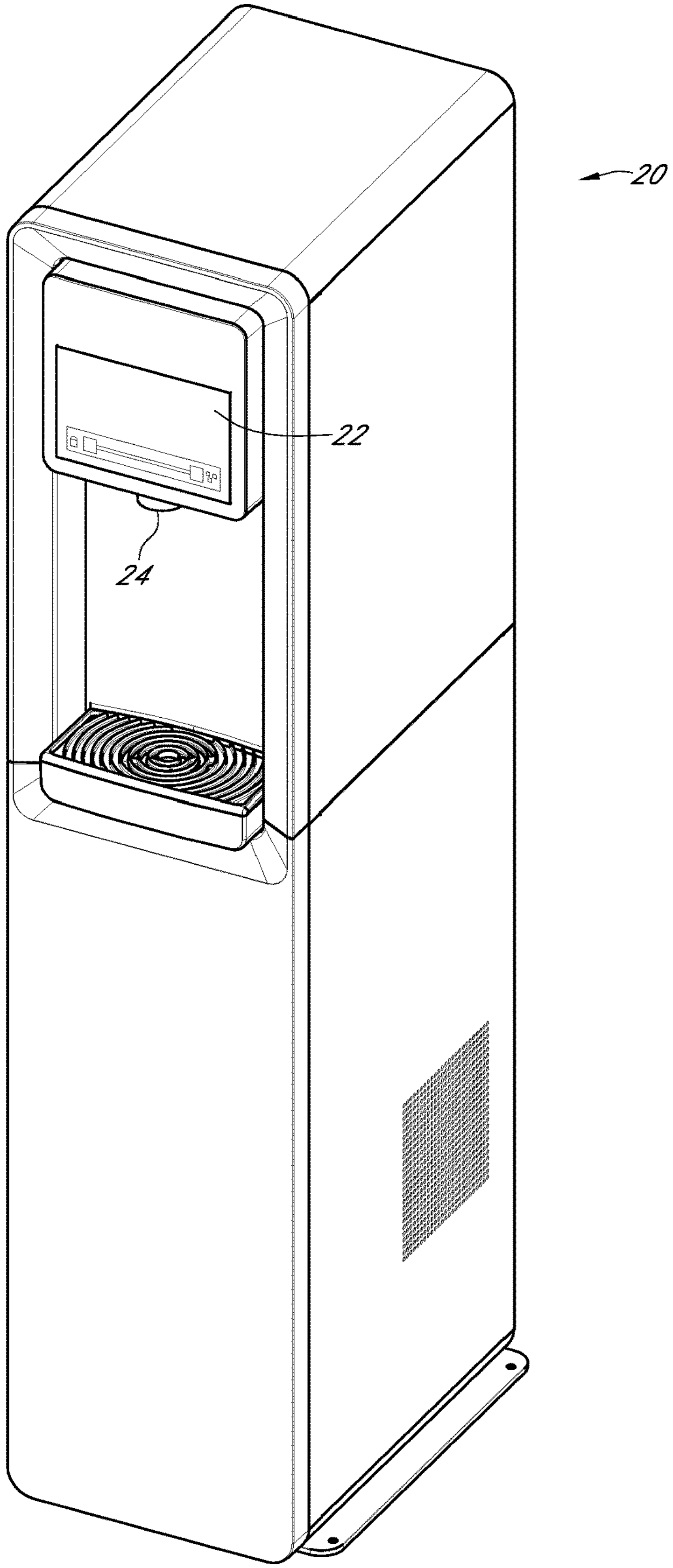
FIG. 1 is a front perspective view of a water dispenser utilizing an embodiment of a rapid water-chilling system of the present invention.
Figure 2:
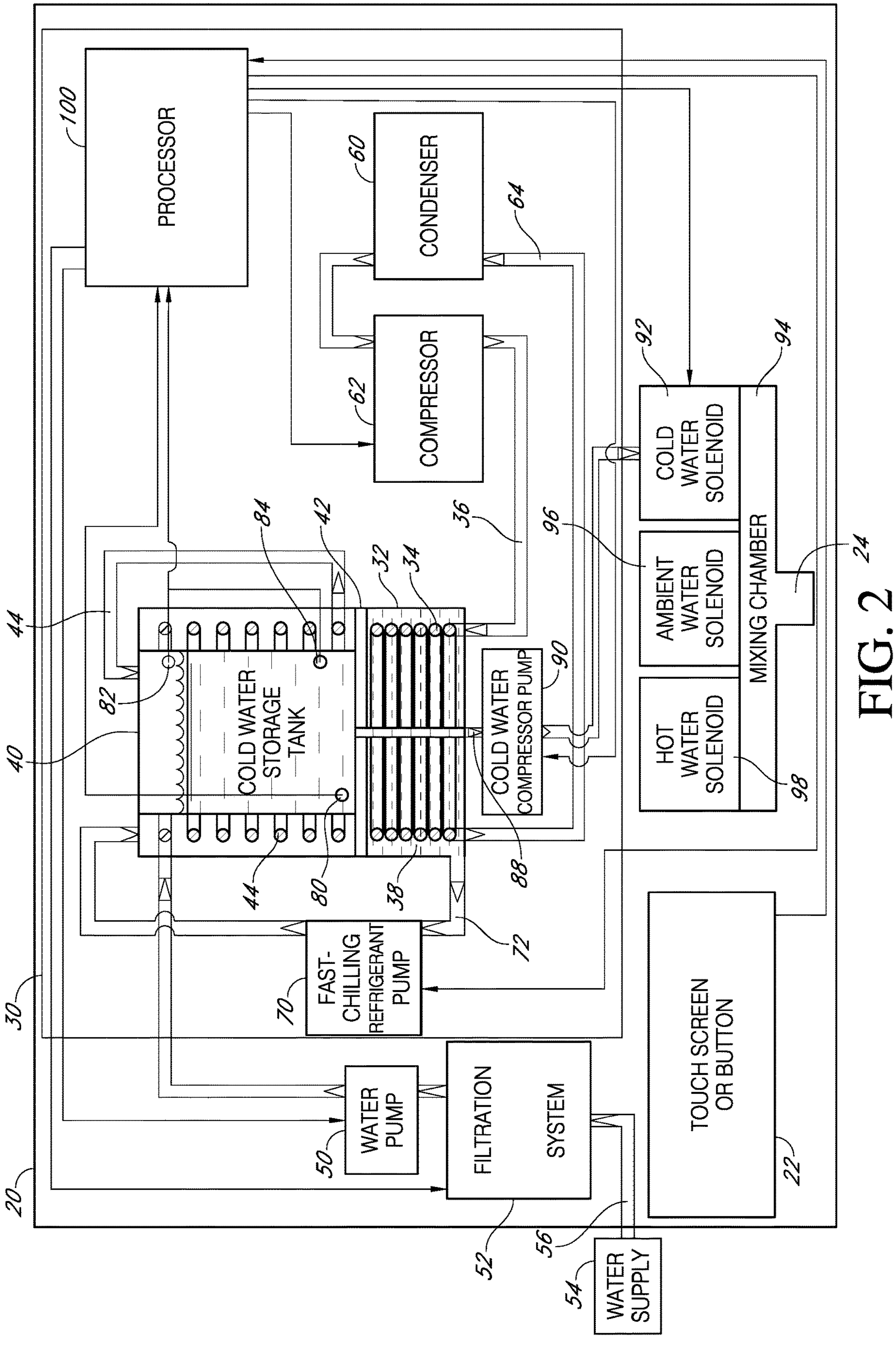
FIG. 2 illustrates a functional block diagram an embodiment of a rapid water-chilling system of the present invention disposed in a water dispenser.

Referring to FIGS. 1-2, an exemplary water dispenser 20 utilizing an embodiment of the rapid water-chilling system 30 of the present invention is depicted. In this exemplary water dispenser 20, the water dispenser 20 has, among other things, a user interface 22 for the user to select what temperature is desired and to dispense water, and a water dispensing nozzle 24. Referring now to FIG. 2, a functional block diagram of an embodiment of the rapid water-chilling system 30 of the present invention, housed in the water dispenser 20, is depicted. This exemplary description discusses use of the rapid water-chilling system 30 with water in a water dispenser, but it should be understood that the rapid water-chilling system 30 of the present invention could be used with any appropriate fluid in any needed context. It is not limited to use just with water in a water dispenser. The rapid water-chilling system 30 in this embodiment includes a rapid chill refrigerant circulation tank 32 having refrigerant coils 34 (shown in cross-section) disposed in the bottom of the rapid chill refrigerant circulation tank 32. The refrigerant coils 34 carry a refrigerant 36 that, as described below, circulates through the refrigerant coils 34 when the rapid water-chilling system 30 is in use. (The fluid directional arrows in FIG. 2 are included to show the direction of flow of fluids in those pipes, coils or tubing when the fluid is flowing through those pipes, coils or tubing. Fluid, as described in detail below, is not always flowing through the pipes, coils or tubing depicted.) The refrigerant 36 in this embodiment is R290 due to the cooling capacity needed in a small size footprint, but it is envisioned that other refrigerants could be used as well. The refrigerant coils 34 in this embodiment are made from copper because of copper's highly efficient thermal transfer properties, but, as one of ordinary skill in the art would understand, any suitable tubing material could be used for the refrigerant coils 34. At the bottom of the rapid chill refrigerant circulation tank 32, in addition to the refrigerant coils 34, the rapid chill refrigerant circulation tank 32 holds fast-chilling refrigerant 38. The fast-chilling refrigerant 38 is disposed outside of the refrigerant coils 34 and flows freely around the refrigerant coils 34. The fast-chilling refrigerant 38 in this embodiment is propylene glycol because it is food-grade safe and can still flow at minus 50 degrees below zero Celsius. It is envisioned though that other refrigerants with the properties of a low freezing point; a high latent heat of vaporization; good thermal conductivity and specific heat capacity characteristics; and chemically stable could also be used for the fast-chilling refrigerant 38.

Figure 8:
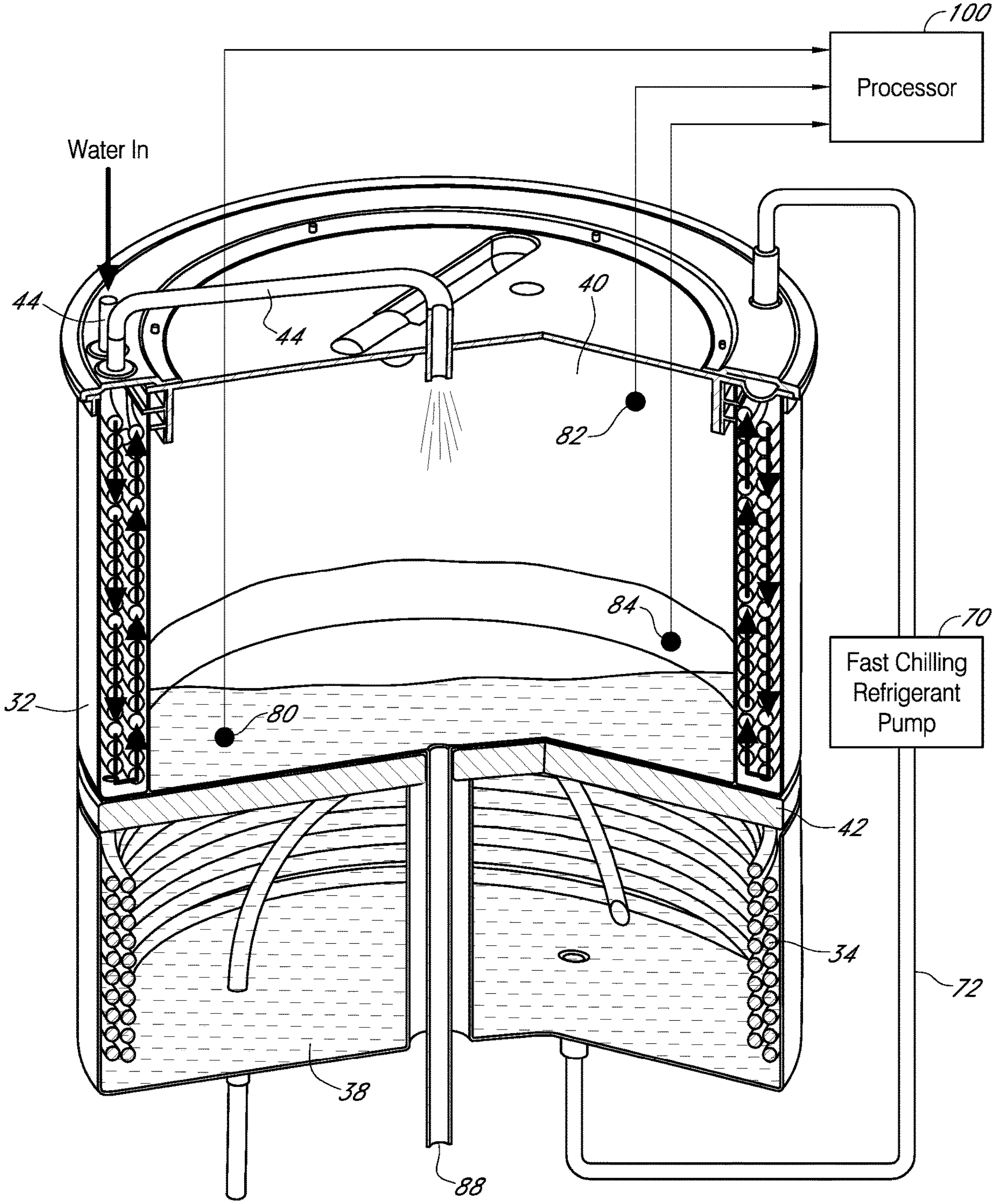
FIG. 8 is a sectional view of a rapid chill refrigerant circulation tank illustrating the flow of water through water inlet coils into the rapid chill refrigerant circulation tank.

Also located within the rapid chill refrigerant circulation tank 32 is a cold water storage tank 40 that, in use, holds water 56. In this embodiment, the cold water storage tank 40 is disposed above the refrigerant coils 34, and a permeable plate 42 separates the cold water storage tank 40 from the refrigerant coils 34 and provides support to the cold water storage tank 40. Although a plate 42 is utilized in this embodiment, the use of a plate 42 is not required. Disposed around the entire outside of the cold water storage tank 40 are water inlet coils 44 (shown in cross-section). The water inlet coils 44, on the intake side, connect to a water supply 54 for the water dispenser 20, such as a tap water source, and on the discharge side, the water inlet coils 44 dispense into the top of the cold water storage tank 40 (FIG. 8). The water inlet coils 44 in this embodiment are made from stainless steel because of stainless steel's sterility properties since they are carrying water for human consumption. One of ordinary skill in the art, though, would understand that any suitable tubing material could be used for the water inlet coils 44. Further, in this embodiment, the water from the water supply 54 goes through a filtration system 52 before a water pump 50 pumps the water through the water inlet coils 44.

Further, in this embodiment, to refrigerate the refrigerant 36, the rapid water-chilling system 30 includes refrigerant chilling system components needed to complete a refrigeration cycle, namely a condenser 60, a compressor 62 and refrigerant cycle tubing 64. The refrigerant cycle tubing 64 carries the refrigerant 36 and is connected to the refrigerant coils 34. The refrigerant cycle tubing 64 is the section of tubing disposed outside of the rapid chill refrigerant circulation tank 32 which connects the refrigeration cycle components (i.e. the condenser 60 and the compressor 62). To circulate the fast-chilling refrigerant 38, the rapid water-chilling system 30 also has tubing 72 that runs from the bottom of the rapid chill refrigerant circulation tank 32 to the top of it, where it discharges fast-chilling refrigerant 38. The fast-chilling refrigerant 38 is pumped through the tubing 72 by a fast-chilling refrigerant pump 70.

Disposed within the cold water storage tank 40, in this embodiment, are a water temperature sensor 80, a high water level sensor 82 and a low water level sensor 84. At the bottom of the cold water storage tank 40 is a discharge tube 88 that flows into a cold water compressor pump 90 that pumps the cold water 56 to a cold water solenoid 92 that controls the dispense rate of the cold water 56 into a mixing chamber 94, from where the water 56 is ultimately dispensed through the water dispensing nozzle 24. In addition to the components of the rapid water-chilling system 30, the water dispenser 20 of this embodiment includes, among other things, a hot water solenoid 98 which connects to a hot water tank (not shown) and an ambient water solenoid 96 which connects an ambient water tank (not shown). The hot water solenoid 98 and an ambient water solenoid 96 control the flow rates of hot and ambient water.

The rapid water-chilling system 30 of this embodiment of the present invention further includes a processor 100 which receives input signals from and sends output signals to the components of the water dispenser 20 (e.g. user interface 22, fast-chilling refrigerant pump 70, cold water solenoid 92, hot water solenoid 98, ambient water solenoid 96, cold water compressor pump 90, compressor 62, water pump 50, filtration system 52, water temperature sensor 80, high water level sensor 82 and low water level sensor 84). The processor 100 further has other functions, including storing data; making computations and issuing component commands to control and keep the rapid water-chilling system 30 and, generally, the water dispenser 20 operating.

Figure 3:
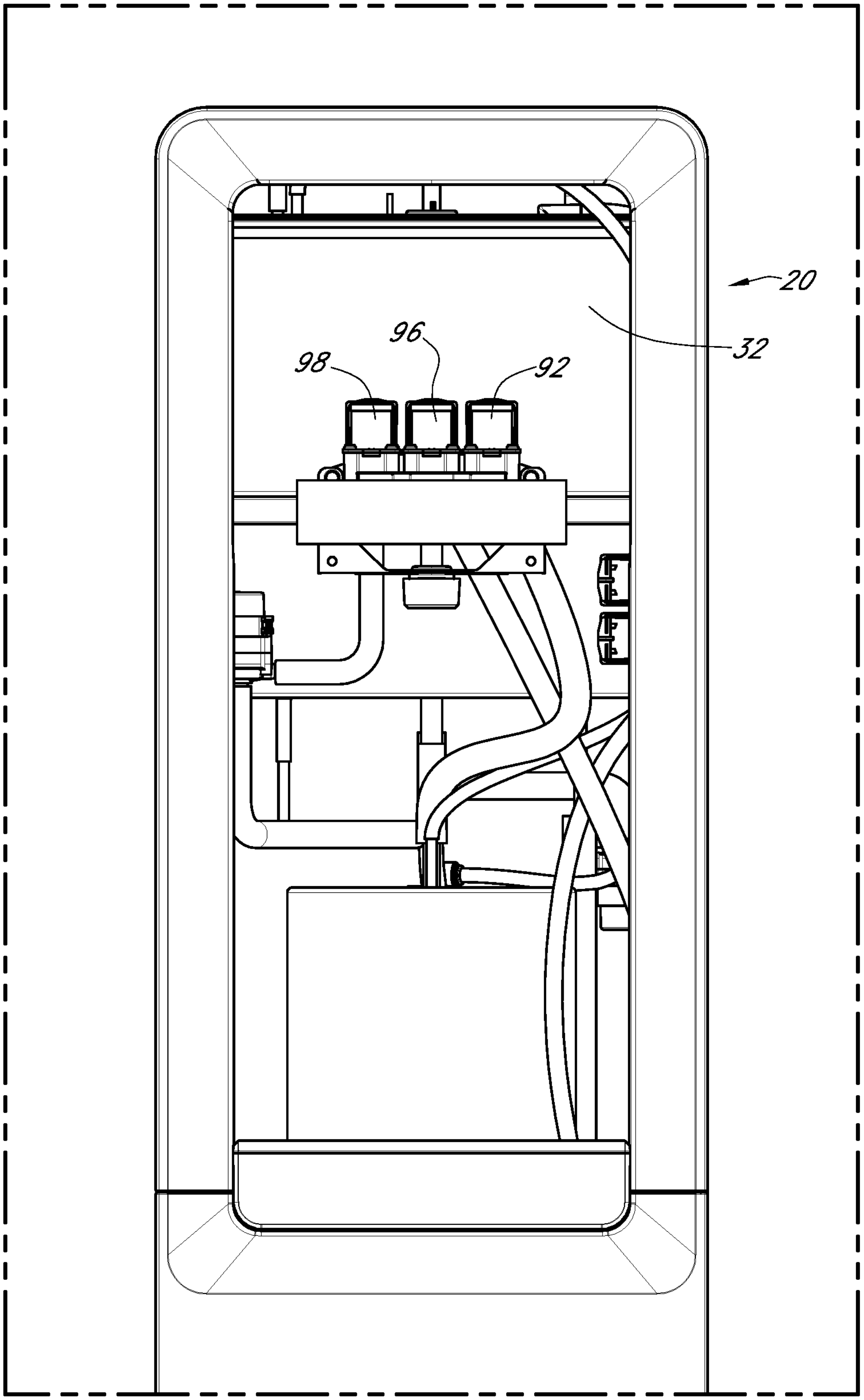
FIG. 3 is a partial front view of a water dispenser utilizing an embodiment of a rapid water-chilling system of the present invention showing some of the interior components of the water dispenser.
Figure 4:
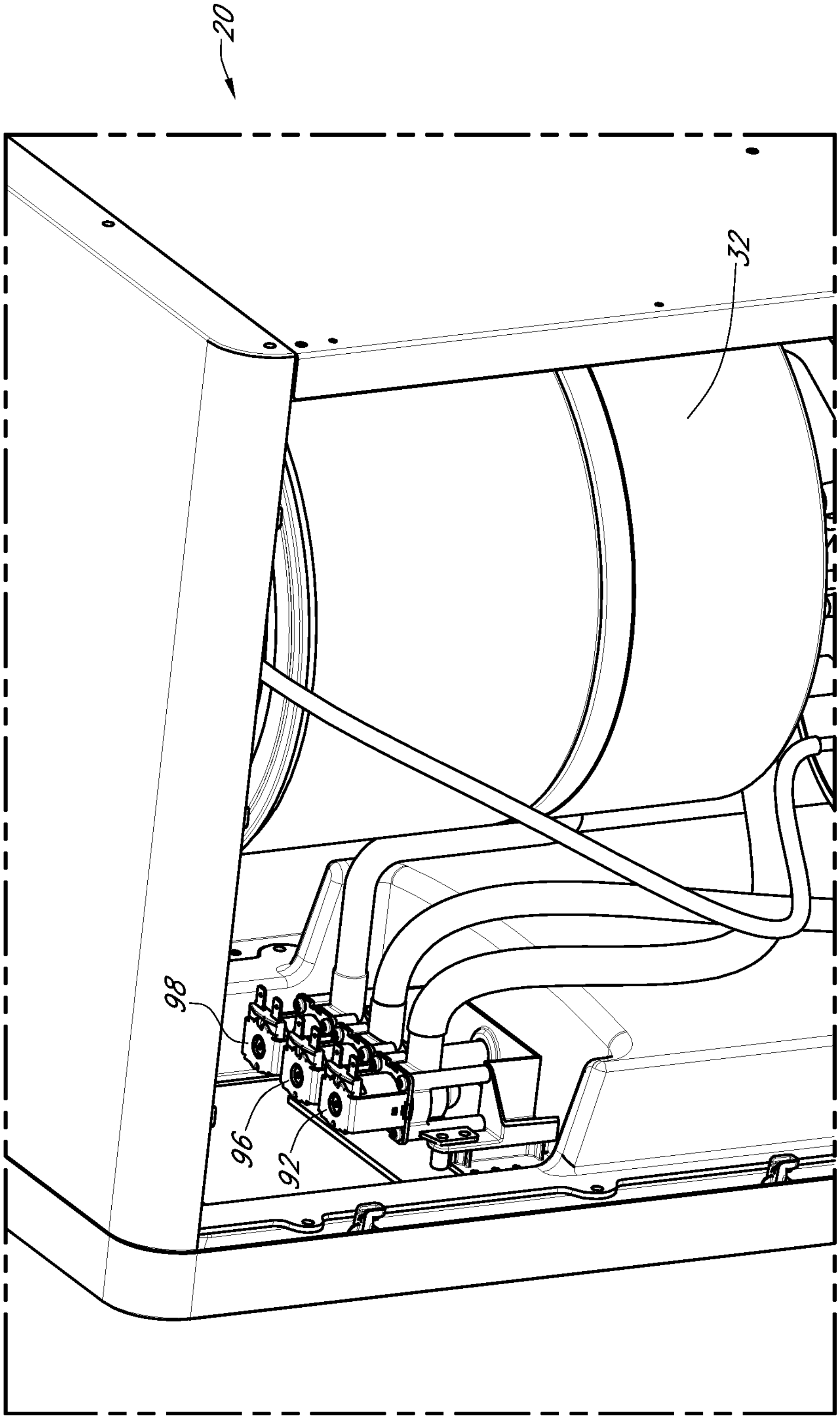
FIG. 4 is a partial right side perspective view of a water dispenser utilizing an embodiment of a rapid water-chilling system of the present invention showing some of the interior components of the water dispenser.
Figure 5:
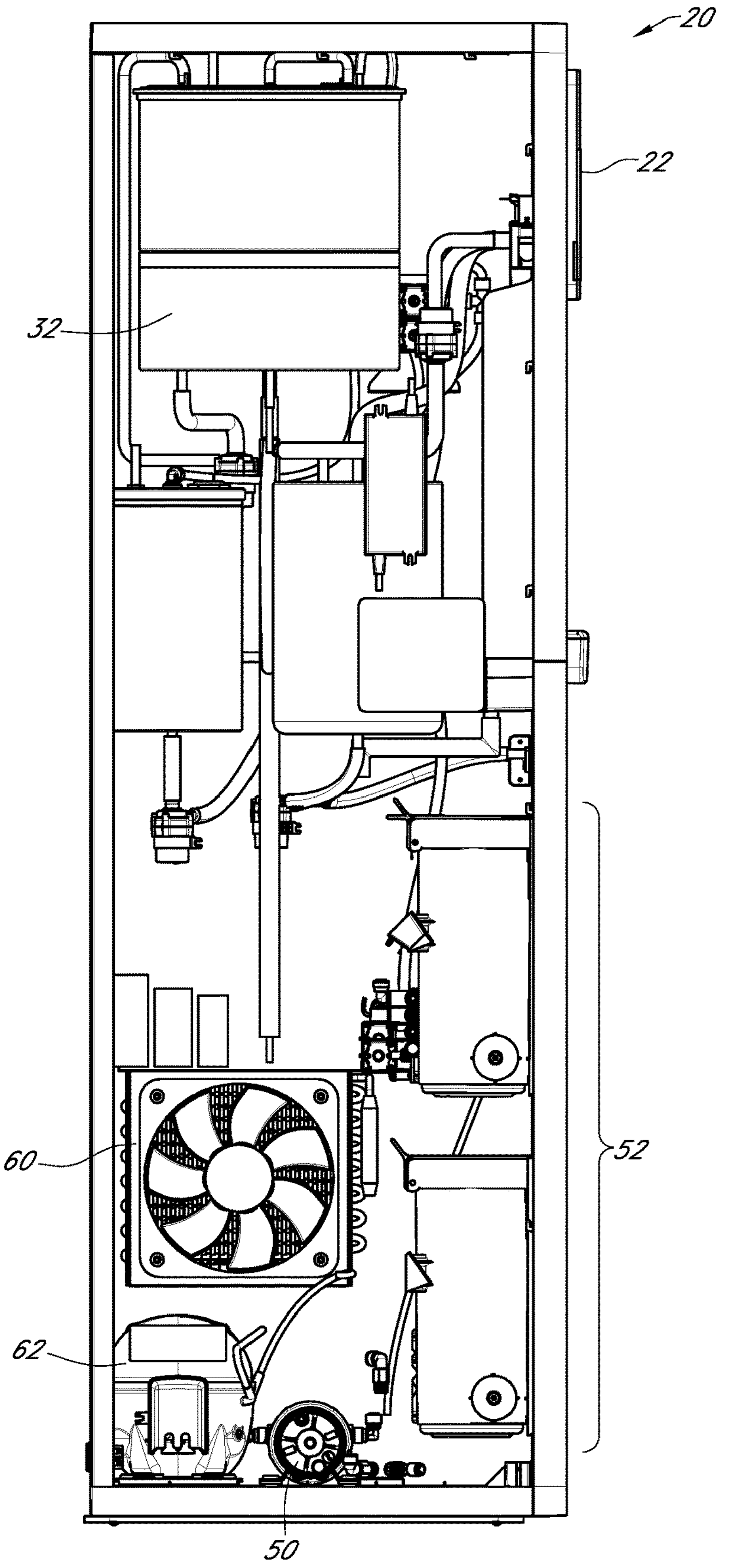
FIG. 5 is a left side view of a water dispenser utilizing an embodiment of a rapid water-chilling system of the present invention showing the interior components of the water dispenser.

FIGS. 3-5 illustrate an embodiment of a water dispenser 20 utilizing a rapid water-chilling system 30 of the present invention. Referring now to FIGS. 6-9, the process of how the rapid water-chilling system 30 of the present invention functions is illustrated and described. In FIG. 7, at step 200, the processor 100 of the water dispenser 20 continuously monitors the water level and temperature of the water 56 in the cold water storage tank 40 at steps 202 and 210. At step 210 and referring to FIG. 8, the processor 100, using the water level sensors 82, 84, continuously checks to see if the water level of the water 56 in the cold water storage tank 40 is within pre-set high and low limits. If the water level of the water 56 is outside the pre-set limits, at step 212, the processor 212 adjusts the water level in the cold water storage tank 40 to bring in within pre-set high and low limits. As illustrated in FIG. 8, if the water level is too low, the processor 100 pumps water through the water inlet coils 44 and into the top of the cold water storage tank 40.

At step 202, the processor 100, using the water temperature sensor 80, continuously checks to see if the water temperature of the water 56 in the cold water storage tank 40 is below a pre-set lower limit. If it is above this pre-set lower limit, that means the water 56 is too warm and needs to be chilled. The water 56 may get warm for a number of reasons, including the water 56 has been sitting for a while or a numbers of users of the water dispenser 20 have depleted the water in the tank and it has been re-filled with ambient water 56. Also, in another embodiment, the process in FIG. 7 may also include a step for checking to see if the water 56 in the cold water storage tank 40 is too cold to ensure that the water 56 in the tank does not freeze.

Figure 6:
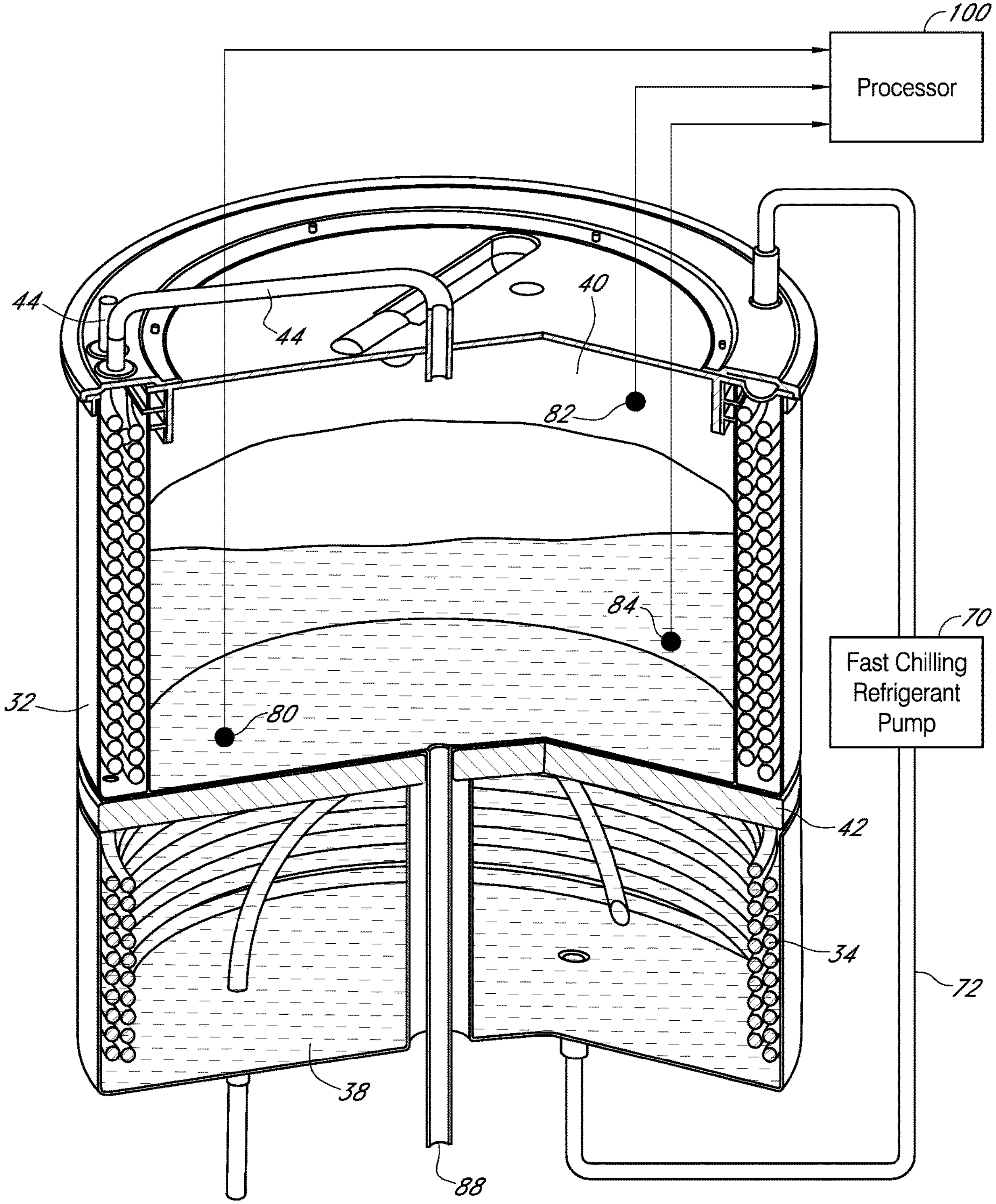
FIG. 6 is a sectional view of a rapid chill refrigerant circulation tank.
Figure 7:
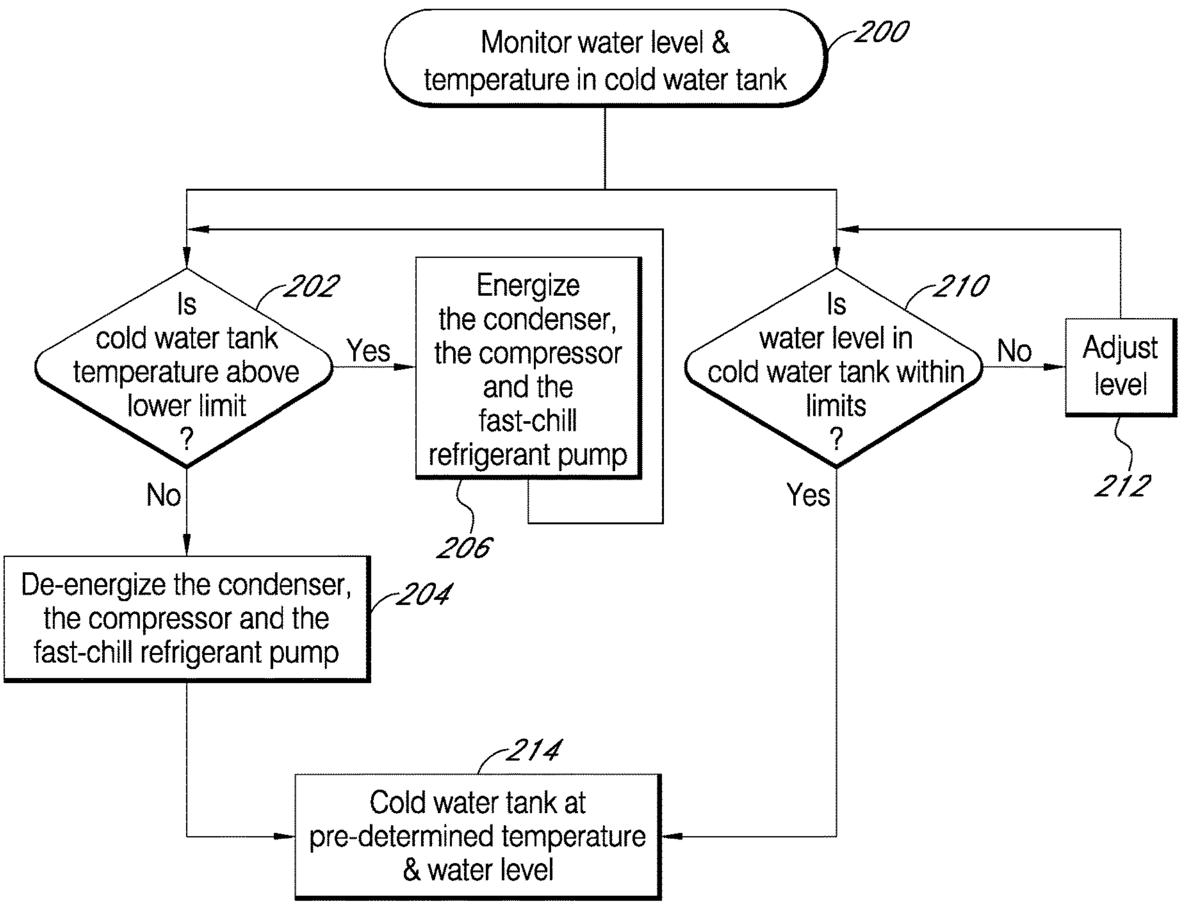
FIG. 7 is a flowchart illustrating an embodiment of a process of the present invention to maintain water in a rapid chill refrigerant circulation tank at a pre-set temperature.

At step 202, if it is determined that the water 56 in the cold water storage tank 40 is above a pre-set lower limit (i.e. too warm), at step 206 and referring to FIGS. 2, 6 and 9, the condenser 60, the compressor 62 and the fast-chill refrigerant pump 70 are energized. The energized condenser 60 and compressor 62 chill the refrigerant 36 in the refrigerant cycle tubing 64. The chilled refrigerant 36 flows through the refrigerant cycle tubing 64 into the refrigerant coils 34. The refrigerant 36, flowing through the refrigerant coils 34, chills the fast-chilling refrigerant 38 (i.e. glycol in this embodiment) that is flowing freely around the refrigerant coils 34. At the same time, the fast-chilling refrigerant pump 70 pumps the fast-chilling refrigerant 38 to the top of rapid chill refrigerant circulation tank 32, where the fast-chilling refrigerant 38 flows down the outside of the cold water storage tank 40 and around the water inlet coils 44 back to the bottom of the rapid chill refrigerant circulation tank 32. The super cold temperature of the fast-chilling refrigerant 38 super chills the water 56 in the water inlet coils 44 and the water 56 in the cold water storage tank 40, since the fast-chilling refrigerant 38 surrounds the water inlet coils 44 and the cold water storage tank 40. The fast-chilling refrigerant 38 never comes in contact with the water 56. Also, by only temporarily exposing the water 56 to the fast-chilling refrigerant 38, it keeps the water 56 from freezing, which is what would happen if the water 56 was exposed to the fast-chilling refrigerant 38 for an extended period. The process of this invention strikes a balance between exposing water 56 to fast-chilling refrigerant 38 for a short period of time to get the water 56 chilled quickly versus exposing the water 56 for too long, where the water 56 would freeze. In one embodiment of a rapid water-chilling system 30 of the present invention, at time of use, the refrigerant 36 is around minus 21 degrees Celsius; the fast-chilling refrigerant is between minus 20 degrees Celsius and minus 5 degrees Celsius; the water 56 in the water inlet coils 44 and the cold water storage tank 40 is between minus 5 degrees Celsius and zero degrees Celsius and the resulting drinking water dispensed is between 2 degrees Celsius to 10 degrees Celsius.

This cycle continues until at step 202, the processor 100 determines that the temperature of the water 56 in the cold water storage tank is below the lower limit (i.e. it is cold enough). Then, at step 204, the processor 100 de-energizes the condenser 60, the compressor 62 and the fast-chilling refrigerant pump 70. At step 214, the processor 100 determines that the water 56 in the cold water storage tank 40 is at the appropriate water level and below the pre-determined water temperature. The rapid water-chilling system 30 goes back to steady-state, depicted in FIG. 6, until the water chilling cycle is activated again.

Referring now to FIG. 10, a performance comparison chart is illustrated. For this chart, the water chilling performance of a water dispenser 20 utilizing an exemplary embodiment of the rapid water-chilling system 30 of the present invention (FIGS. 5 and 6) was compared to four chilled water systems on the market. The test performed on the five water dispensing systems was a 24 ounce serving size stress test. For this test, 24 ounces of water was continually dispensed from each cooler, with a 1-minute recovery period between each 24 ounce dispensing. The temperature in the 24 ounce dispensed water container was measured for each 24 ounces that was dispensed. This test is designed to see how well the cold water storage tank can hold water at a cold temperature with repeated, back-to-back use of the water dispenser to address the problem of later users in a repeated use cycle not getting cold water, or cold enough water, from the water dispenser. As illustrated in the chart in FIG. 10, the exemplary embodiment of the rapid water-chilling system 30 of the present invention performed exceptionally well. The exemplary embodiment of the rapid water-chilling system 30 of the present invention was still dispensing water at temperature below 8° C. after ten 24 ounce servings. Three of the comparative systems, on the other hand, were dispensing water over 15° C., essentially the temperature of cold tap water, which is not especially desirable, after 8 or less 24 ounce servings.

Although certain embodiments and features of a rapid water-chilling system have been described herein, the scope of coverage of this patent is not limited thereto. On the contrary, this patent covers all embodiments of the teachings of the disclosure that fairly fall within the scope of permissible equivalents.

What is claimed is:

1. A rapid water-chilling system for use in a water dispenser, comprising:

- a closed-cycle refrigeration system for a first refrigerant, wherein the closed-cycle refrigeration system includes a set of first refrigerant tubing that carries the first refrigerant, and the first refrigerant changes states between a liquid and a gas in the closed-cycle refrigeration system;
- a chilling tank having a first chamber and a second chamber that are in fluid communication with one another, wherein:
  - disposed within the first chamber of the chilling tank are:
    - a second refrigerant that exists solely in a liquid state in the chilling tank; and
    - a plurality of first refrigerant coils formed from a portion of the set of first refrigerant tubing that carry the first refrigerant inside the chilling tank;
    - wherein, in use, the plurality of first refrigerant coils refrigerates the second refrigerant;
  - disposed within the second chamber of the chilling tank are:
    - a cold water storage tank; and
    - a plurality of water inlet coils;
- a circulation pump for pumping the second refrigerant; wherein the circulation pump is in fluid communication with the first chamber of the chilling tank and the second chamber of the chilling tank for circulating the second refrigerant from the first chamber to the second chamber;
- wherein, in use, the first refrigerant chills the second refrigerant and, when activated, the circulation pump pumps the second refrigerant from the first chamber to the second chamber of the chilling tank to put the second refrigerant in contact with an outside of the cold water storage tank and an outside of the plurality of water coils to chill water contained within each; and
- wherein, after contacting the outside of the cold water storage tank and the outside of the plurality of water coils, the second refrigerant returns to the first chamber of the chilling tank.

2. The rapid water-chilling system for use in a water dispenser of claim 1, wherein the second refrigerant is propylene glycol.

3. The rapid water-chilling system for use in a water dispenser of claim 1, wherein the first refrigerant is R290.

4. The rapid water-chilling system for use in a water dispenser of claim 1, wherein a portion of the plurality of water inlet coils are disposed around the circumference of the outside of the cold water storage tank.

5. The rapid water-chilling system for use in a water dispenser of claim 1, further comprising a temperature sensor disposed within the cold water storage tank.

6. The rapid water-chilling system for use in a water dispenser of claim 1, further comprising a water level sensor disposed within the cold water storage tank.

7. The rapid water-chilling system for use in a water dispenser of claim 1, wherein the second chamber is disposed above the first chamber in the chilling tank.

8. The rapid water-chilling system for use in a water dispenser of claim 7, wherein gravity is used to return the second refrigerant to the first chamber from the second chamber.

9. The rapid water-chilling system for use in a water dispenser of claim 1, further comprising a permeable plate disposed between the first chamber and the second chamber of the chilling tank.

10. A water dispenser in fluid communication with a water supply, comprising:

- a water dispensing nozzle; and
- a rapid water-chilling system in fluid communication with the water dispensing nozzle, comprising:
  - a closed-cycle refrigeration system for a first refrigerant, wherein the closed-cycle refrigeration system includes a set of first refrigerant tubing that carries the first refrigerant, and the first refrigerant changes states between a liquid and a gas in the closed-cycle refrigeration system;
  - a chilling tank having a first chamber and a second chamber that are in fluid communication with one another, wherein:
  - disposed within the first chamber of the chilling tank are:
    - a second refrigerant that exists solely in a liquid state in the chilling tank; and
    - a plurality of first refrigerant coils formed from a portion of the set of first refrigerant tubing that carry the first refrigerant inside the chilling tank;
    - wherein, in use, the plurality of first refrigerant coils refrigerates the second refrigerant;
  - disposed within the second chamber of the chilling tank are:
    - a cold water storage tank; and
    - a plurality of water inlet coils;
  - a circulation pump for pumping the second refrigerant; wherein the circulation pump is in fluid communication with the first chamber of the chilling tank and the second chamber of the chilling tank for circulating the second refrigerant from the first chamber to the second chamber;
  - wherein, in use, the first refrigerant chills the second refrigerant and, when activated, the circulation pump pumps the second refrigerant from the first chamber to the second chamber of the chilling tank to put the second refrigerant in contact with an outside of the cold water storage tank and an outside of the plurality of water coils to chill water contained within each for dispensing through the water dispensing nozzle; and
  - wherein, after contacting the outside of the cold water storage tank and the outside of the plurality of water coils, the second refrigerant returns to the first chamber of the chilling tank.

11. The water dispenser in fluid communication with a water supply of claim 10, the second refrigerant is propylene glycol.

12. The water dispenser in fluid communication with a water supply of claim 10, wherein the refrigerant in the refrigerant chilling system is R290.

13. The water dispenser in fluid communication with a water supply of claim 10, further comprising a permeable plate disposed between the cold water storage tank and the plurality of refrigerant coils.

14. The water dispenser in fluid communication with a water supply of claim 10, further comprising a temperature sensor disposed within the cold water storage tank.

15. The water dispenser in fluid communication with a water supply of claim 10, further comprising a water level sensor disposed within the cold water storage tank.

16. A method for delivering a sustained supply of cold water supply from a water dispenser, comprising the steps of:

providing a water dispenser; comprising:

a water pump in fluid communication with a water supply;

a processor, storing a cold water tank lower temperature limit;

a water dispensing nozzle;

a rapid water-chilling system in fluid communication with the water pump and the water dispensing nozzle, comprising:

a closed-cycle refrigeration system for a first refrigerant, wherein the closed-cycle refrigeration system includes a set of first refrigerant tubing that carries the first refrigerant, and the first refrigerant changes states between a liquid and a gas in the closed-cycle refrigeration system;

a chilling tank having a first chamber and a second chamber that are in fluid communication with one another, wherein:

disposed within the first chamber of the chilling tank are:

a second refrigerant that exists solely in a liquid state in the chilling tank; and a plurality of first refrigerant coils formed from a portion of the set of first refrigerant tubing that carry the first refrigerant inside the chilling tank; wherein, in use, the plurality of first refrigerant coils refrigerates the second refrigerant;

disposed within the second chamber of the chilling tank are:

a cold water storage tank; and a plurality of water inlet coils;

a circulation pump for pumping the second refrigerant; wherein the circulation pump is in fluid communication with the first chamber of the chilling tank and the second chamber of the chilling tank for circulating the second refrigerant from the first chamber to the second chamber;

wherein, in use, the first refrigerant chills the second refrigerant and, when activated, the circulation pump pumps the second refrigerant from the first chamber to the second chamber of the chilling tank to put the second refrigerant in contact with an outside of the cold water storage tank and an outside of the plurality of water coils to chill water contained within each for dispensing through the water dispensing nozzle; and wherein, after contacting the outside of the cold water storage tank and the outside of the plurality of water coils, the second refrigerant returns to the first chamber of the chilling tank;

monitoring the temperature of the water in the cold water storage tank; and when the temperature of the water in the cold water storage tank rises above the cold water storage tank lower temperature limit, energizing the closed-cycle refrigeration system to circulate the first refrigerant;

circulating the first refrigerant through the plurality of refrigerant coils in the first chamber of the chilling tank, wherein the first refrigerant in the plurality of refrigerant coils chills the second refrigerant disposed in the first chamber of the chilling tank;

energizing the second refrigerant circulation pump to pump the chilled second refrigerant from the first chamber of the chilling tank to the second chamber of the chilling tank, wherein the second refrigerant flows inside the second chamber of the chilling tank, down the outside of, and in contact with, the plurality of water inlet coils and down the outside of, and in contact with, the outside of the cold water storage tank, wherein the second refrigerant chills water contained inside the plurality of water inlet coils and inside the cold water storage tank; and dispensing the chilled water through the water dispensing nozzle.

17. The method for delivering sustained cold water from a water dispenser of claim 16, wherein, the processor further stores cold water tank upper and lower water level limits, further comprising the steps of:

providing a plurality of water level sensors disposed within the cold water storage tank;

monitoring the water lever within the cold water storage tank using the plurality of water level sensors; and when the level of the water in the cold water storage tank falls outside of the stored cold water tank upper and lower water level limits, adjusting the water level in the cold water storage tank.

18. The method for delivering sustained cold water from a water dispenser of claim 17, wherein of the at the step of monitoring the water lever within the cold water storage tank using the plurality of water level sensors, when the water level falls below the cold water tank lower water level limit, energizing the water pump to pump water through the plurality of water inlet coils and into the cold water storage tank until the water in the cold water storage tank reaches the cold water tank upper water level limit.

19. The method for delivering sustained cold water from a water dispenser of claim 16, wherein, at the step of, when requested, dispensing the chilled water through the water dispensing nozzle, dispensing cold water from the water dispensing nozzle at a temperature below 8° C. at a rate of ten 24 ounce glasses or less over a nine-minute period.

* * * * *